Nov. 29, 1927.  
L. C. COLE  
1,650,692  
LOCOMOTIVE TIRE BORING MILL  
Filed Dec. 22, 1924  
4 Sheets-Sheet 4

INVENTOR  
L. C. Cole.  
BY  
Joseph W. Schofield  
ATTORNEY

Patented Nov. 29, 1927.

1,650,692

UNITED STATES PATENT OFFICE.

LYNDON C. COLE, OF HAMILTON, OHIO, ASSIGNOR TO NILES-BEMENT-POND COMPANY, OF NEW YORK, N. Y., A CORPORATION OF NEW JERSEY.

LOCOMOTIVE-TIRE-BORING MILL.

Application filed December 22, 1924. Serial No. 757,465.

This invention relates to machine tools and particularly to a machine tool of large size adapted for performing heavy cutting operations upon forgings such as locomotive wheel tires.

An object of the present invention is to provide a metal cutting machine such as a locomotive tire turning machine with improved work supporting and clamping mechanism so that it may be quickly positioned on the rotatable work table and rigidly clamped thereto quickly and with a minimum of labor.

Another object of the invention is to provide a work clamping mechanism for a machine of the above type which may be moved by mechanical means into and out of operative position and then forced into final and clamping position by fluid pressure means.

Another object of the invention is to improve the controlling device for operating this clamping mechanism.

With these and other objects in view, my invention consists in the features of construction and operation set forth in the following specification and illustrated in the accompanying drawings.

In the drawings annexed hereto and forming a part of this specification, I have shown my invention embodied in a tire turning machine adapted particularly for surfacing the tread of locomotive wheel tires but it will be understood that the invention can be otherwise embodied and that the drawings are not to be construed as defining or limiting the scope of the invention, the claims appended to this specification being relied upon for that purpose.

In the drawings:

Fig. 6 is a sectional view taken on line 6—6 of Fig. 2.

Figure 1:
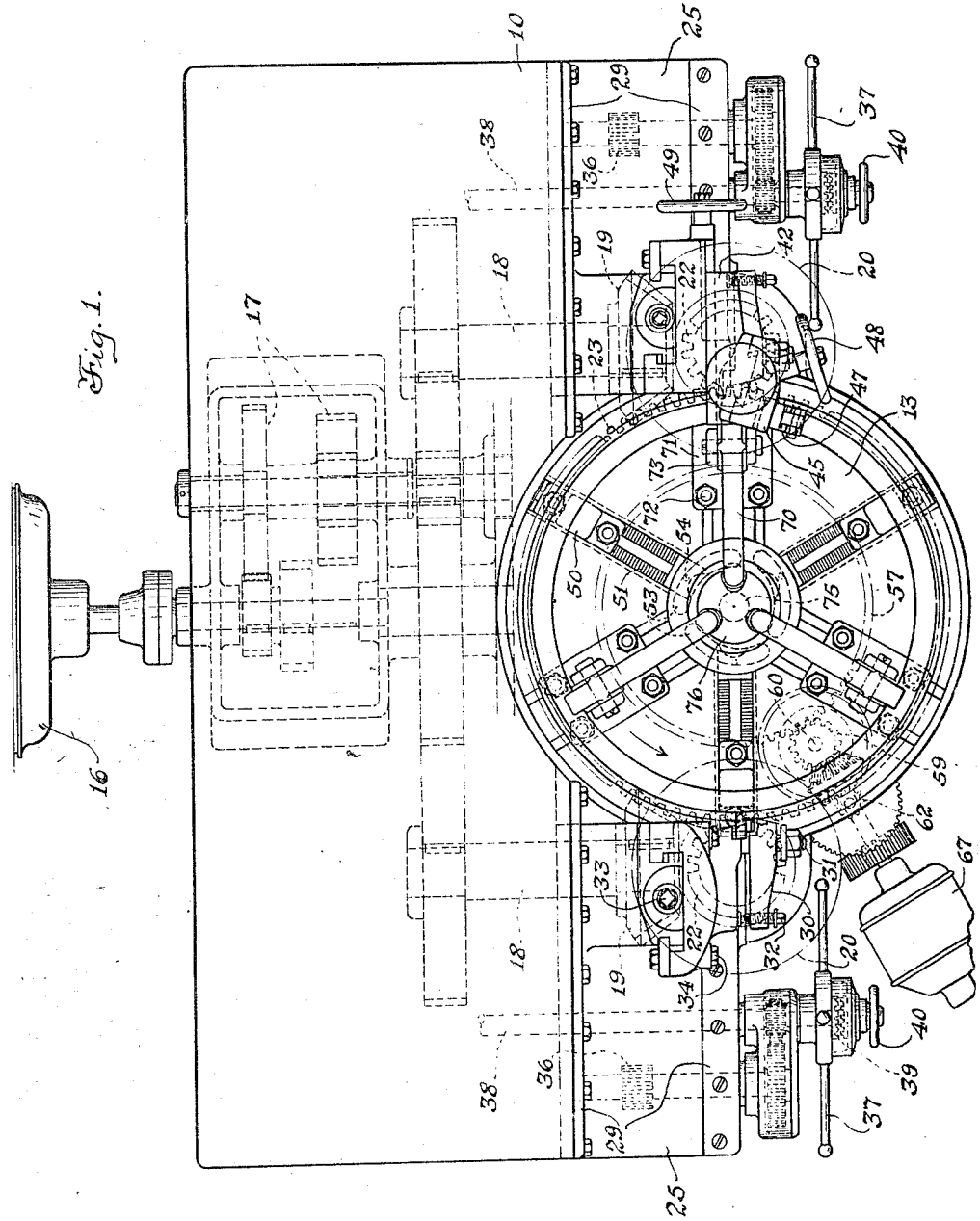
Figure 1 is a plan view of the complete machine.

In the above mentioned drawings, I have shown but one embodiment of the invention which is now deemed preferable but it is to be understood that changes and modifications may be made within the scope of the appended claims without departing from the spirit of the invention.

Briefly, and in its broadest aspect, my invention consists in the following principal parts: first, a base; second, a work table rotatably mounted thereon preferably mounted on an elongated hollow spindle; third, carriages or slides having adjustable tools thereon and adapted to engage and cut work mounted on the table; fourth, centering jaws on the work table adapted to contact with a surface of the work and adapted to be moved radially toward or from the axis of rotation of the work table; fifth, clamping jaws for rigidly holding the work blank in position on the work table; sixth, adjustable means to move the clamping jaws into and out of operative position relative to the work blank; and seventh, pneumatically actuated means for forcing the jaws into clamping engagement with the blank being operated on.

Referring more in detail to the figures of the drawings, I provide a base 10 preferably comprising a housing having bearings 11 vertically disposed in its forward part. Within these bearings 11 is adapted to be rotated a spindle 12 provided at its upper end with a work table 13 which may be suitably fastened thereto by any preferred means. The work table 13 during rotation bears upon an annular plane surface 14 provided on the base 10 immediately surrounding the spindle 12 and near its upper end. The spindle 12 extends completely through the bearings 11 provided for it in the base 10 and at its lower end is provided with a retaining ring 15 suitably threaded thereto.

In order to rotate this spindle 12 and its table 13, a motor 16 preferably located in rear of the machine is connected through suitable change gears 17 with two parallel horizontal shafts 18 extending forwardly and disposed within the base 10. These shafts 18 at their forward ends are provided with bevel gears 19 in mesh with corresponding bevel gears 20 on the lower ends of vertically disposed pinion shafts 21. Each of these vertically disposed shafts 21 at its upper end is provided with a pinion 22 in mesh with a spur gear 23 bolted to the lower face of the work table 13 and rotating therewith. From this description, it will be seen that the table 13 may be rotated at different relatively low speeds, the two pinions 22 serving to make the rotation uniform, powerful, and without lost motion.

Disposed horizontally and on either side of the upper portions of the housing 10 are tool carriages 25 having at their inner or adjacent ends tool heads 26 upon which cutting tools 27 may be mounted. These carriages 25 are adapted to slide upon planed ways on the housing or base 10. As shown in Fig. 3, ways 28 are provided on the housing 10 so disposed that the carriage 25 is supported upon surfaces at right angles to each other so that its support will be sufficiently rigid. Retaining strips 29 adjacent both of the ways are provided which are adapted to engage over suitable portions of the carriage 25. The particular tools 27 shown in the present embodiment of the invention comprise formed tools adapted to completely finish the tread contour on the outside surface of a locomotive tire. These tools 27 comprise flat plate-like pieces of metal, one surface being shaped to correspond exactly with the contour desired to be cut. As shown most clearly in Fig. 2, these cutters or tools 27 are securely clamped in position by means of clamping levers 30 adapted to pivot about the axis of the bolt 31 and be oscillated to firmly clamp the cutter by means of an adjustable screw 32 at the outer end of the levers 30. The mountings for the tools 27 on the two carriages 25 are materially different and are designed to retain the tools 27 in position so that they may simultaneously engage and cut the blank A. That is, they are so mounted that they will properly engage the blank A while it is being rotated in one direction. First, the tool head 26 on the carriage 25 at the left will be described. As the forming tool 27 may require vertical adjustment, the carriage 25 is provided with vertically disposed ways on which the tool head 26 is mounted. The tool 27 and its clamping means 30 above described are carried upon this tool head 26. By means of a suitable screw 33, the vertical position of the tool head 26 may be varied to position its tool 27 properly relative to the blank A being operated on. As the work to which these tools 27 may be subjected is very heavy, the tool head 26, if desired, may be clamped during operation directly to the tool carriage 25 by means of the clamping screws 34 as shown. In order to advance the tools 27 into cutting position and also to engage them during the work turning operation, the carriages 25 are provided with rack teeth 35 upon their lower surface adapted to be engaged by a suitable pinion 36. This pinion 36 through suitable gearing is connected with a shaft 38 rotatably carrying a hand wheel 37. Rotation therefore of the hand wheel 37 serves to position the tool carriage 25 and hold it in contact with the work A. Also, if desired, power means may be provided to feed the carriage 25 forwardly during operation. For this purpose, a feed shaft 38 is provided horizontally mounted within the housing 10 and at its forward end extending through the axis of the hand wheel 37. This feed shaft is provided with a clutch 39 splined thereto and adapted to be brought into engagement with a corresponding clutch part on the hand wheel 37. For this purpose a small hand wheel 40 is provided. It will be seen that by rotating the small hand wheel 40 the teeth of the clutch members 39 will be engaged so that the feed shaft 38 will positively rotate the driving connections and advance the carriage 25 horizontally along its ways.

Figure 2:
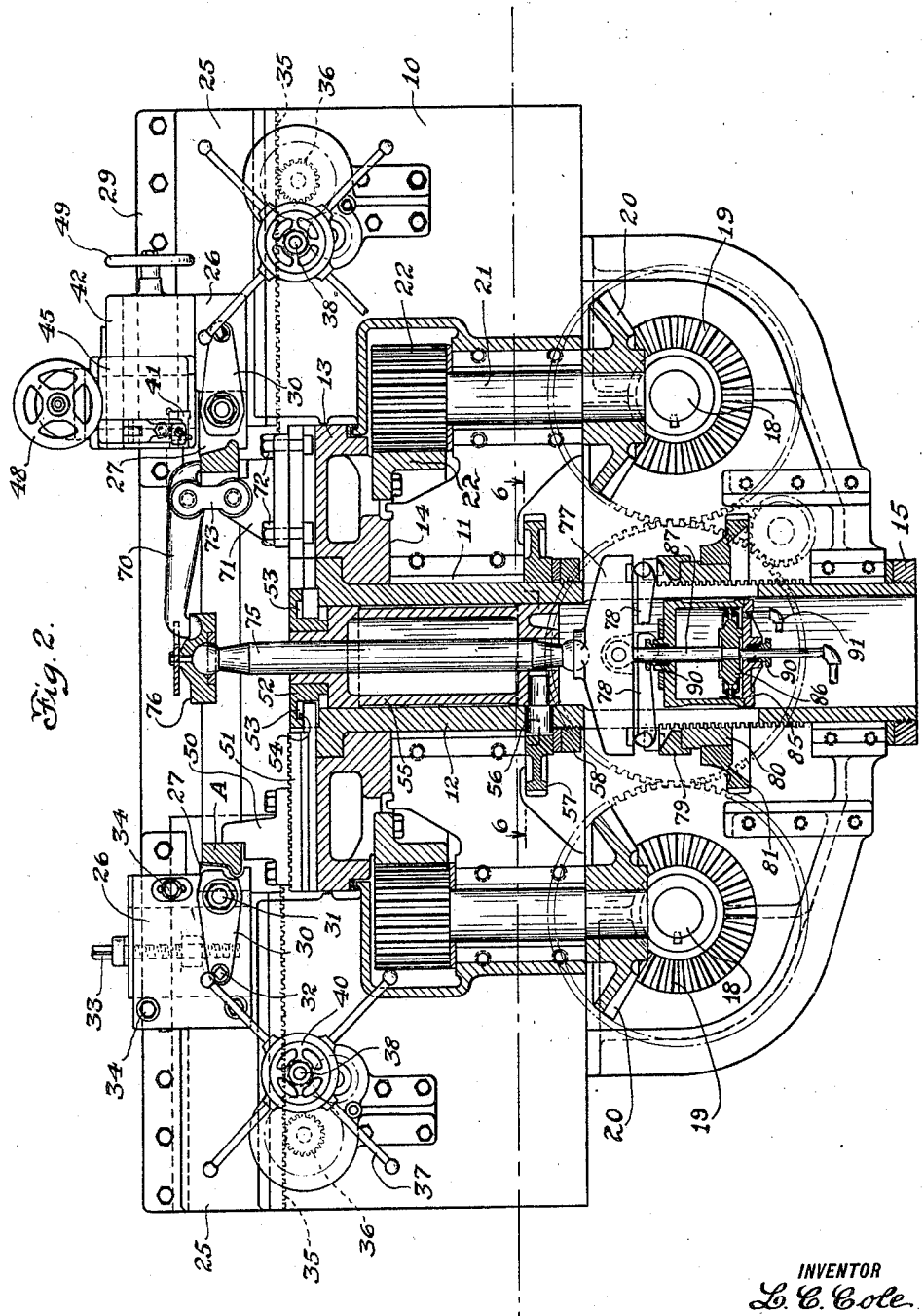
Fig. 2 is a front elevation of the machine, parts being broken away to more clearly show the work centering and clamping mechanisms.
Figure 3:
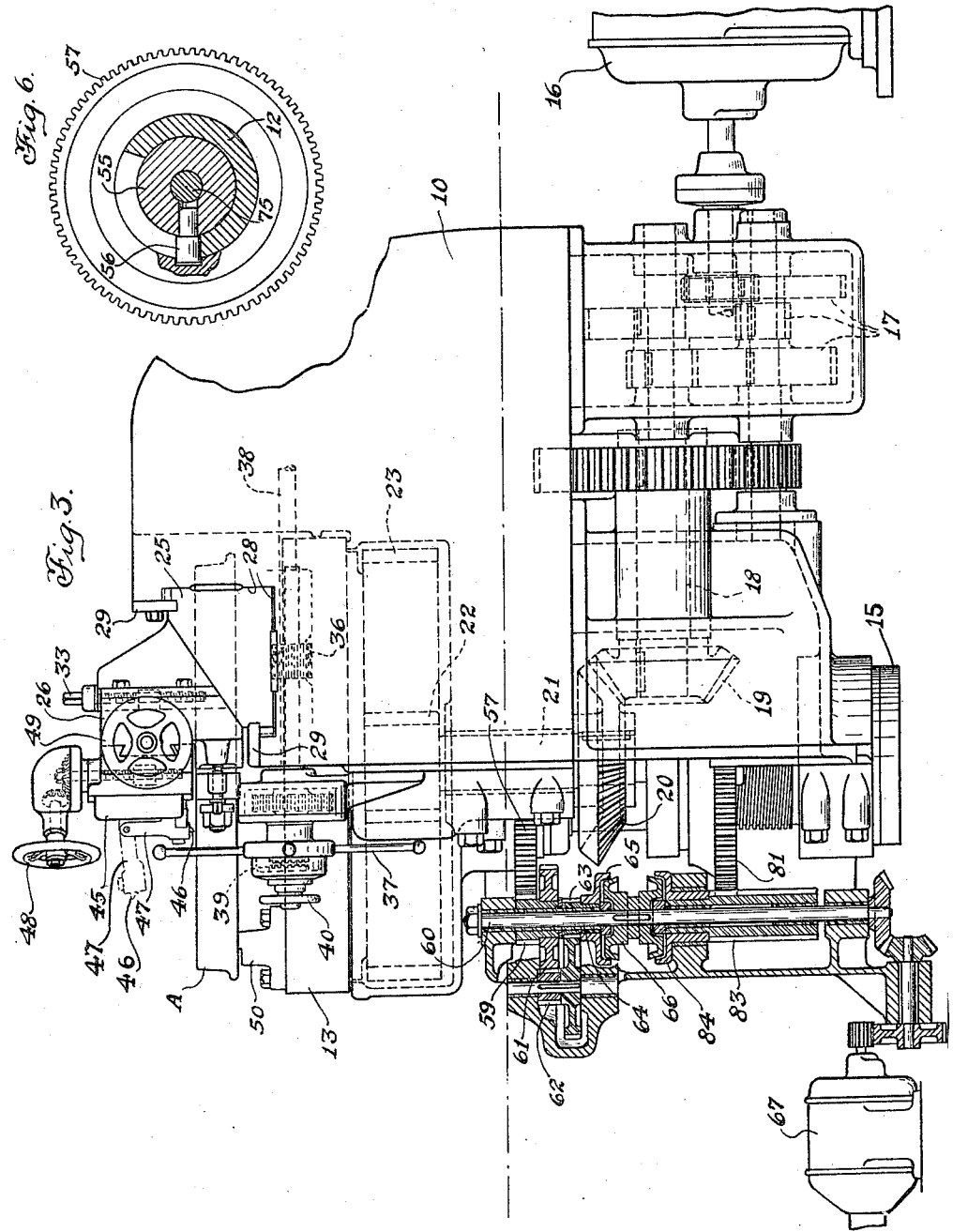
Fig. 3 is a side elevation, parts being shown in section to more clearly disclose their construction.

Preferably, and as shown in Fig. 2, the right hand tool carriage 25 may have a special tool 41 mounted thereon for performing a facing operation upon the upper face of the tire or blank A. This may be used after the tire has been completely surfaced upon its outer periphery and after the clamping jaws have been removed and others, adapted to engage the internal surface, substituted therefor. To carry this tool 41, a supplemental tool slide 42 is mounted as shown in Fig. 2 upon the forward and upper portions of the tool head 26 mounted on the tool carriage 25 so that this facing tool 41 may be moved horizontally and vertically upon the carriage 25 and its tool head 26 as well as horizontally by movement of the slide 42. A finishing tool 43 for the tire tread A is provided on tool head 26 which may be clamped in position upon the slide in the same manner as the one previously described on the left hand carriage 25. Adjusting means for this cross slide 42 are also provided similar to those above described. Upon the slide 42 on this carriage 25 is a supplementary vertically movable slide 45. It is upon this supplemental vertically moving slide that is carried the cutter 41 of plate form adapted to surface the upper face of the tire. In addition a small tool 46 may be carried at the lower end of a swinging arm 47 for cutting the "witness groove" with which tires are usually provided to indicate the maximum allowable wear. To raise and lower the supplemental cross slide 45, a hand wheel 48 operates through bevel gears to rotate a screw rotatably mounted thereon. The supplemental horizontal slide 42 on the tool head 26 may be adjusted by a screw rotated by a hand wheel 49. It will be understood that when the tread of the tire is being turned, the cross slide 42 will be withdrawn to inoperative position so that its tools 41 and 46 will not interfere with the cutting operation.

In order to properly center the work A upon the table 13, three work engaging and supporting members 50 are provided adjustably clamped upon radially disposed arms 51 provided within the upper surface of the work table 13. These engaging members 50 are, as shown, clamped directly to these radially disposed arms 51 in a manner so that they may be adjusted radially for any predetermined size of work A being operated upon. In order to simultaneously actuate these members 50 radially to center the work, a cam plate 52 is provided centrally disposed relative to the work table 13. This plate 52 is provided with three spiral grooves 53 each of which is adapted to be engaged by a projection 54 on the inner end of the radial arms 51. Angular movement, therefore, of this cam plate 52 relative to the work table 13 serves to move the radial arms 51 toward or from the axis of rotation of the table 13. Thus, by an outward movement of the arms 51, the supporting members 50 are brought into contact with the bore of the tire on blank A and is centered correctly therefrom. Angular movement of the cam plate 52 in the opposite direction relative to the work table 13 will move the supporting members 50 inward and thus release them and permit removal of the blank A.

In order to effect rotative movement of the cam plate 52 relative to the work spindle 12 and table 13, a member in the form of a sleeve 55 is inserted within the hollow spindle 12 which is provided with a projection 56 extending radially outward from the sleeve 55 through an arcuate slot formed in one side of the spindle 12. This projection 56 on the sleeve 55 engages a key-way or spline in a gear 57 rotatably mounted upon the outer periphery of the spindle 12 and suitably retained in position by a ring 58 threaded or otherwise fastened to the spindle 12. In order to rotate this gear 57 to effect the movement of the cam plate 52 and radial arms 51 for the centering operation, the gear 57 is adapted to be engaged by a pinion 59 mounted rotatably upon a vertically disposed shaft 60. This shaft 60 is rotated by another gear 61 fast on the shaft 60 through a compound reducing gear 62 in mesh with a gear 63 upon a sleeve 64 on shaft 60. This sleeve 64 is provided with a clutch member 65 adapted to be moved into or out of contact with a rotatable clutch member 66 adjacent thereto. These clutch members 65 and 66 are clearly shown in Fig. 3, the rotating member 66 of which is preferably keyed directly to the vertically disposed shaft 60 extending through the sleeve and adapted to be operated in either direction by rotation of a small electric motor 67 drivingly connected thereto through any appropriate gearing. It will be seen therefore that rotation of the motor 67 in one direction and with the clutch members 65 and 66 in operative position the gear 57 may be rotated relative to the spindle 12 and table 13 and thus the cam plate 52 may be rotated relative thereto in a direction to move the radially disposed arms 51 outwardly. A work blank A mounted on the table 13 upon the outsides of these members 50 when in their inner positions will be accurately centered by this simultaneous outward radial movement of the three centering members 51. The outward movement of the members 50 is not sufficient to distort the tire as these members 50 are not relied upon to hold the blank in position during operation. Rotation of the table 13 by the means above described during the cutting operation when the clutch 65—66 is out of operative position tends to hold the members 50 in their outer position due to the drag upon the gear 57 by its driving connections.

Figure 4:
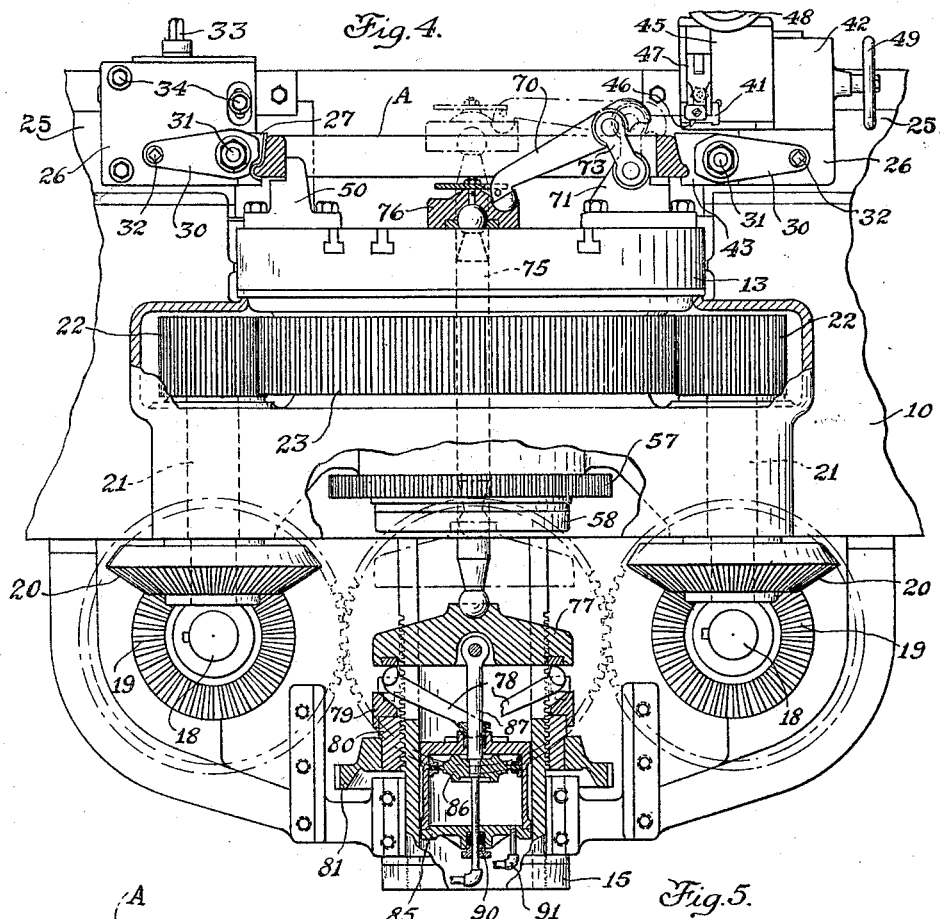
Fig. 4 is a fragmentary front elevation with the clamping means in their inoperative position.
Figure 5:
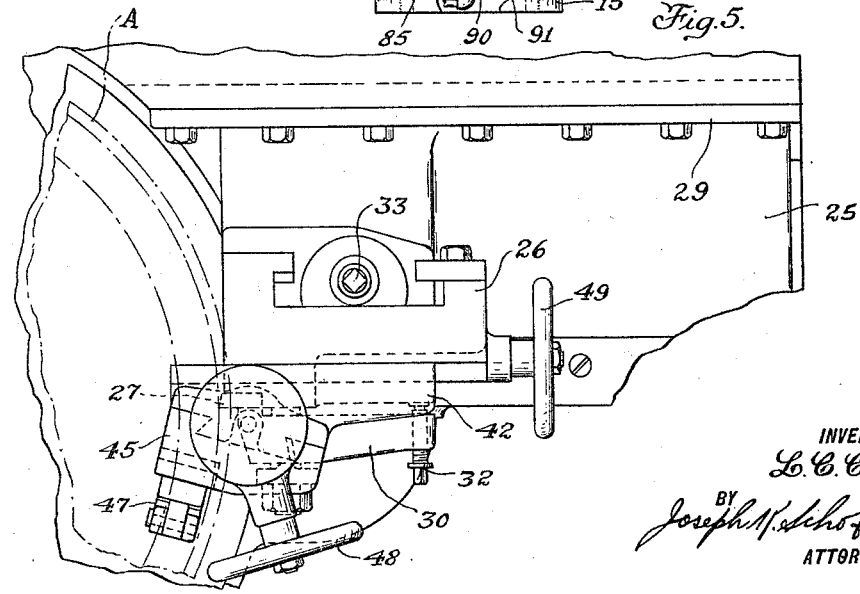
Fig. 5 is a plan view of one side of the machine showing the tool carriage and slides.

In addition to a centering operation, which is not depended on to retain the work A in position during operation, the work blank A is adapted to be quickly and rigidly clamped in position upon the table 13 by special clamps 70 provided for that purpose. Preferably three of these clamps or clamping jaws 70 are provided shown most clearly in Fig. 2. These clamping jaws include pedestals 71 clamped directly to the work table 13 and having a bearing surface for the lower surface of the particular blank A being operated upon. The pedestals 71 may be adjustably mounted on the work table 13 and held in position by means of bolts 72 entering T-slots provided in the table. Pivotally mounted on these pedestals 71 are links 73 which in turn pivotally engage an intermediate point of the jaws 70. The outer ends of the jaws or levers 70 comprise the work contacting portions and the inner extended arms form their actuating ends. By means of a central bar 75 extending vertically through the work spindle 12 and adapted to be raised or lowered, the inner ends of the jaws 70 are adapted to be actuated. As shown the bar 75 is slidable within holes provided within the sleeve 55. Preferably, the three jaws 70 engage at their inner ends an equalizing plate 76 which is in engagement with the upper end of the vertically movable bar 75. It will be seen therefore that with the bar 75 in its lowermost position, the jaws 70 will be positioned so that work A may be readily positioned and centered upon the work table 13 (see Fig. 4). Elevating the central vertically movable bar 75 will first oscillate the links 73 to the position shown in Fig. 2 and then oscillate the jaws 70 to engage the work blank A.

In order to raise and lower this central bar 75 to actuate the clamping jaws 70, mechanical means are provided which preferably are used for quickly moving the jaws 70 to their operative and inoperative position. In addition to these mechanical means, pneumatic means are provided to effect a final powerful clamping pressure of the jaws 70 against the work blank A. The mechanical means comprise a cross piece 77 bearing against the lower end of the bar 75 and resting at its opposite ends upon the short arms of levers 78 supported by a ring member 79 surrounding the work spindle 12. As shown in Fig. 2, the cross piece extends thorugh longitudinal slots cut into the spindle 12 on opposite sides. Below the ring member 79 is provided a second ring member 80 with screw threads upon its outer surface adapted to engage corresponding screw threads formed directly upon the spindle 12. Rotation, therefore, of this ring 80 will raise or lower it and thus raise or lower the first ring 79 and the central bar 75. To effect this rotative movement of the ring 80 relative to the spindle 12 and the ring 79, a gear 81 is fastened directly to ring 80 which is adapted to be engaged by an elongated pinion 83 rotatable upon shaft 60. This pinion 83 is provided at its upper end with a clutch member 84 adapted to contact with a corresponding clutch member preferably oppositely disposed to and forming a part of clutch 66 heretofore described. It will therefore be seen that movement of this clutch 84 to operative position and by rotating the motor 67 in the desired direction, the ring member 80 may be traversed up or down upon the spindle to raise or lower the central bar 75 and thus move the clamping jaws 70 into and out of operative position.

To finally clamp the jaws 70 rigidly against the work blank A with an extremely high pressure, pneumatic means are mounted on the spindle 12 and are, as shown, preferably associated with the ring member 79 and the supporting cross piece 77 for the bar 75. This pneumatic means is most clearly shown in Figs. 2 and 4 and comprises a cylinder 85, the piston 86 of which is attached to the supporting cross piece 77 for the bar 75 through a link 87 which serves as a piston rod. The cylinder 85 enclosing the piston 86 is movable up or down relative to this piston 86 and rod 87 and, upon its upper surface, forms a bearing for the inner ends of the levers 78 engaging the supporting ring 79. These levers 78 are fulcrumed upon the ring 79 surrounding the spindle 12 so that oscillation of the levers 78 will force the ring 79 and cross piece 77 slightly toward or from each other. It will be seen that by admitting air or other fluid to a position within the cylinder 85 and above the piston 86 that the cylinder 85 will be elevated thus oscillating the levers 78 and forcing upward the cross piece 77 and bar 75 so that the jaws 70 will be rigidly forced into their clamping position. To unclamp the jaws 70, it is only necessary to release the air from above the piston 86 and to admit air to a point below the piston 86 which serves to lower the cylinder 85 and thus move the levers 78 to their opposite or inoperative position to release the member 77 and lower it relative to bearing surfaces on the ring 79 and permit slight lowering of the central bar 75. As shown in Fig. 2, the cylinder 85 is provided with stuffing boxes 90 at its upper and lower ends through which pass the piston rod 87 and a lower extension thereto. The piston rod 87 extension is bored and at its lower end is provided with a swivel connection. Through this connection air under pressure may be admitted and the cylinder 85 and parts associated thereto permitted to rotate with the spindle 12. At a point above the piston 86 the piston rod 87 is drilled to intercept the central bore. To admit air to the cylinder 85 at a point below the piston 86, a connection 91 may be inserted in its lower face.

What I claim is:

1. A machine tool comprising in combination, a base, a work supporting and rotating spindle having a table thereon, work clamping means on said table, power actuated means to advance said clamping means into and out of operative postion relative to the work, and independently acting means to move said clamping means to their final clamping position upon the work, said advancing means being mounted on and axially movable on the spindle.

2. A machine tool comprising in combination, a base, a work supporting table thereon, a plurality of work clamping means on said table, power actuated means to advance said clamping means into operative position relative to the work, and pneumatic means to simultaneously move said clamping means to their final clamping position upon the work.

3. A machine tool comprising in combination, a base, a work supporting and rotating table thereon, work clamping means on said table, actuating means therefor centrally disposed below said table, screw threaded means to advance the actuating means to operative position, and pneumatic means associated with said actuating means to move said clamping means to their final clamping position upon the work.

4. A machine tool comprising in combination, a base, a work supporting and rotating spindle having a table thereon, work clamping means on said table, actuating means therefor centrally disposed upon said spindle below said table, screw threaded means engaging the spindle to advance the actuating means to operative position, and pneumatic means carried by and moving with said actuating means to move said clamping means to their final clamping position upon the work.

5. A machine tool comprising in combination, a base, a work supporting and rotating spindle having a table thereon, a plurality of work clamping means on said table, actuating means therefor centrally disposed below said table, screw threaded means to simultaneously advance the actuating means to operative position, and pneumatic means carried by and moving with said actuating means to simultaneously move said clamping means to their final clamping position upon the work.

6. A machine tool comprising in combination, a base, a work supporting and rotating spindle having a table thereon, a plurality of work clamping jaws on said table, actuating means therefor comprising a vertically movable rod, adjustable supporting means for the rod disposed below said table, screw threaded means to raise and lower the rod to move the actuating jaws into and out of operative position, and pneumatic means associated with said actuating means to move said clamping jaws to their final clamping position upon the work.

7. A machine tool comprising in combination, a base, a work supporting table thereon, work clamping means on said table, work centering means thereon, cam actuated means for operating the centering means, means to move the clamping means into and out of operative position, and pneumatic means to effect the clamping movement of said means.

8. A machine tool comprising in combination, a base, a work supporting table thereon, a plurality of work clamping jaws on said table, work centering means thereon, cam actuated means for operating the centering means, actuating means for said clamping jaws, means to move the actuating means into and out of operative position, and pneumatic means to effect the clamping movement of said means.

9. A machine tool comprising in combination, a base, a work supporting table thereon, work clamping jaws on said table, work centering means thereon, cam actuated means for operating the centering means, a vertically movable rod to advance the clamping means into and out of operative position, screw threaded means to move said rod to control the movement of the jaws, and independently controlled pneumatic means to effect the clamping movement of said jaws.

10. A machine tool comprising in combination, a base, a work supporting table thereon, work clamping means on said table, clamping jaws pivotally mounted on the table, common centrally disposed means for oscillating said jaws, said means extending below the table and provided with screw threaded means to simultaneously oscillate the jaws, and means to rotate the screw threaded means to move the jaws to their operative and inoperative positions.

11. A machine tool comprising in combination, a base, a work supporting table thereon, work clamping means on said table, work centering means thereon, a centrally disposed cam for actuating the centering means, clamping jaws pivotally mounted on the table, common centrally disposed means for oscillating said jaws, said means extending below the table and provided with screw threaded means to simultaneously oscillate the jaws, and means to rotate the screw threaded means to move the jaws to their operative and inoperative positions.

12. A machine tool comprising in combination, a base, a work supporting table thereon, work clamping means on said table, clamping jaws pivotally mounted on the table, common centrally disposed means for oscillating said jaws, said means extending below the table and provided with screw threaded means to simultaneously oscillate the jaws, means to rotate the screw threaded means to move the jaws to their operative and inoperative positions, and supplementary means to effect the final clamping movement of the jaws.

13. A machine tool comprising in combination, a base, a work supporting table thereon, work clamping means on said table, work centering means thereon, a centrally disposed cam for actuating the centering means, clamping jaws pivotally mounted on the table, common centrally disposed means for oscillating said jaws, said means extending below the table and provided with screw threaded means to simultaneously oscillate the jaws, means to rotate the screw threaded means to move the jaws to their operative and inoperative positions, and pneumatic means carried by and moving with the screw threaded means for effecting the final clamping movement of the jaws.

In testimony whereof, I hereto affix my signature.

LYNDON C. COLE.